United States Patent
Rombakh et al.

(10) Patent No.: US 9,872,062 B1
(45) Date of Patent: Jan. 16, 2018

(54) ENFORCING SYNCHRONIZATION BY EMBEDDING AUDIO WITHIN VIDEO FRAME DATA

(71) Applicant: Wyse Technology L.L.C., Santa Clara, CA (US)

(72) Inventors: Oleg Rombakh, Los Gatos, CA (US); Richard Goldberg, Los Gatos, CA (US)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 0 days.

(21) Appl. No.: 15/438,843

(22) Filed: Feb. 22, 2017

(51) Int. Cl.
| | |
|---|---|
| *H04N 7/173* | (2011.01) |
| *H04N 21/43* | (2011.01) |
| *H04N 5/04* | (2006.01) |
| *H04N 21/233* | (2011.01) |
| *H04N 21/234* | (2011.01) |
| *H04N 21/242* | (2011.01) |
| *H04N 21/61* | (2011.01) |
| *H04N 21/854* | (2011.01) |
| *H04N 19/70* | (2014.01) |
| *H04N 21/426* | (2011.01) |

(52) U.S. Cl.
CPC ........... *H04N 21/4307* (2013.01); *H04N 5/04* (2013.01); *H04N 19/70* (2014.11); *H04N 21/233* (2013.01); *H04N 21/23424* (2013.01); *H04N 21/242* (2013.01); *H04N 21/42653* (2013.01); *H04N 21/6125* (2013.01); *H04N 21/85406* (2013.01)

(58) Field of Classification Search
None
See application file for complete search history.

(56) References Cited

U.S. PATENT DOCUMENTS

| | | | |
|---|---|---|---|
| 6,181,383 B1 * | 1/2001 | Fox | H04N 21/23424 348/423.1 |
| 9,699,229 B2 * | 7/2017 | Stockhammer | H04L 65/4069 |
| 9,716,920 B2 * | 7/2017 | Chen | H04N 21/816 |
| 2006/0101322 A1 * | 5/2006 | Abbott | H04N 7/17318 715/203 |
| 2007/0092200 A1 * | 4/2007 | Black | H04N 21/4113 386/217 |
| 2011/0280316 A1 * | 11/2011 | Chen | H04N 13/0048 375/240.25 |
| 2012/0013746 A1 * | 1/2012 | Chen | G11B 27/034 348/180 |

(Continued)

*Primary Examiner* — William J Kim
(74) *Attorney, Agent, or Firm* — Brian Tucker; Kirton McConkie

(57) ABSTRACT

Synchronization of audio and video data can be enforced by embedding audio within video frame data. In a network environment in which audio and video data are generated on a source computing device and then transferred over the network to a destination computing device for output, the source computing device can be configured to encode the video data into an encoded video stream. As part of this encoding, the source computing device can also embed audio in the encoded video stream in a manner that associates the audio with corresponding video frames. The encoded video stream with the embedded audio can then be transferred over the network. The destination computing device can be configured to parse the encoded video stream to remove the audio and route it to an audio buffer and then route the encoded video stream to a GPU.

20 Claims, 8 Drawing Sheets

(56) References Cited

U.S. PATENT DOCUMENTS

| | | | |
|---|---|---|---|
| 2012/0020413 A1* | 1/2012 | Chen | H04N 19/597 375/240.26 |
| 2013/0287366 A1* | 10/2013 | Wang | G06F 17/30852 386/241 |
| 2014/0195651 A1* | 7/2014 | Stockhammer | H04N 21/23439 709/219 |
| 2014/0222962 A1* | 8/2014 | Mao | H04N 21/4305 709/219 |
| 2014/0229529 A1* | 8/2014 | Barone | H04L 65/4076 709/203 |
| 2014/0372624 A1* | 12/2014 | Wang | H04L 65/60 709/231 |
| 2015/0062353 A1* | 3/2015 | Dalal | G11B 27/3036 348/194 |
| 2015/0095450 A1* | 4/2015 | Vitthaladevuni | H04L 47/25 709/217 |
| 2015/0200986 A1* | 7/2015 | Stockhammer | H04L 65/4069 709/219 |
| 2015/0269629 A1* | 9/2015 | Lo | G06Q 30/0269 705/14.66 |
| 2015/0271237 A1* | 9/2015 | Stockhammer | H04N 21/234 709/219 |
| 2015/0312303 A1* | 10/2015 | Krishna | H04L 65/80 709/219 |
| 2016/0011923 A1* | 1/2016 | Walker | H04L 65/80 714/49 |
| 2016/0072637 A1* | 3/2016 | Gholmieh | H04L 65/4076 709/219 |
| 2016/0134672 A1* | 5/2016 | Lotfallah | H04L 65/60 709/231 |
| 2016/0164943 A1* | 6/2016 | Walker | H04L 65/601 709/219 |
| 2016/0205158 A1* | 7/2016 | Lo | H04L 65/4076 709/219 |
| 2016/0234536 A1* | 8/2016 | Stockhammer | H04L 67/02 |
| 2016/0261665 A1* | 9/2016 | Stockhammer | H04L 65/4069 |
| 2016/0337424 A1* | 11/2016 | Mandyam | H04L 65/4076 |
| 2016/0366452 A1* | 12/2016 | Roessler | H04N 21/6112 |
| 2016/0373324 A1* | 12/2016 | Gholmieh | H04L 65/4076 |
| 2016/0373546 A1* | 12/2016 | Lotfallah | H04L 65/4084 |
| 2016/0380853 A1* | 12/2016 | Lotfallah | H04L 43/062 709/224 |
| 2017/0063960 A1* | 3/2017 | Stockhammer | H04L 65/607 |
| 2017/0156015 A1* | 6/2017 | Stockhammer | H04S 3/006 |
| 2017/0201761 A1* | 7/2017 | Walker | H04N 19/46 |

* cited by examiner

ENFORCING SYNCHRONIZATION BY EMBEDDING AUDIO WITHIN VIDEO FRAME DATA

CROSS-REFERENCE TO RELATED APPLICATIONS

N/A

BACKGROUND

It can be difficult to keep audio synchronized with video in a network environment. This is especially true in virtual desktop infrastructure environments where the audio and video data are typically delivered over separate logical channels. Video data is typically transmitted as a series of encoded frames. Each frame may require a different amount of processing (i.e., time) to decode and render the frame. For this reason, network protocols will typically provide some form of frame acknowledgment which will control the rate at which frames are transferred over the network. If the processing of frames is delayed for some reason, a corresponding delay in the transfer of subsequent frames may also result. Given that the audio is likely transferred independent of the video data and requires relatively simple processing, if the video data is delayed, it will likely cause the audio to become out of sync with the video.

BRIEF SUMMARY

The present invention extends to methods, systems, and computer program products for enforcing synchronization by embedding audio within video frame data. In a network environment in which audio and video data are generated on a source computing device and then transferred over the network to a destination computing device for output, the source computing device can be configured to encode the video data into an encoded video stream. As part of this encoding, the source computing device can also embed audio in the encoded video stream in a manner that associates the audio with corresponding video frames.

The encoded video stream with the embedded audio can then be transferred over the network such that the destination computing device will receive a video frame and its corresponding audio at the same time. The destination computing device can be configured to parse the encoded video stream to remove the audio and route it to an audio buffer and then route the encoded video stream to a GPU. In this way, the audio and video data will be output in synchronization as if it had been generated locally at the destination computing device rather than having been transferred over the network.

In one embodiment, the present invention is implemented as a method for enforcing synchronization by embedding audio within video frame data. A source computing device can receive a sequence of audio segments. For each received audio segment, the audio segment is embedded in a NAL unit of an access unit that defines a corresponding video frame. The access units having the NAL units with the embedded audio segments are then transmitted over a network to a destination computing device.

In another embodiment, the present invention is implemented as a method for enforcing synchronization by embedding audio within video frame data. A destination computing device receives a sequence of access units. Each access unit is processed by examining NAL units of the access unit. Upon detecting an SEI NAL unit in an access unit, a payload of the SEI NAL unit is extracted and stored in an audio buffer. Each access unit is then provided to a GPU.

In another embodiment, the present invention is implemented as computer storage media storing computer-executable instructions which when executed implement an encoder that is configured to receive audio and video data and generate an encoded video stream by: creating an access unit for each frame defined in the video data; and for each access unit, storing a segment of the audio in an SEI NAL unit of the access unit.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, an encoded video stream should be construed as video data that has been encoded in accordance with the H.264 standard, the H.265 standard, or any subsequent compression standard that employs similar techniques for organizing encoded video data into network abstraction layer (NAL) units. An access unit should be construed as a set of NAL units which when decoded produce a single frame (or image).

Figure 1:
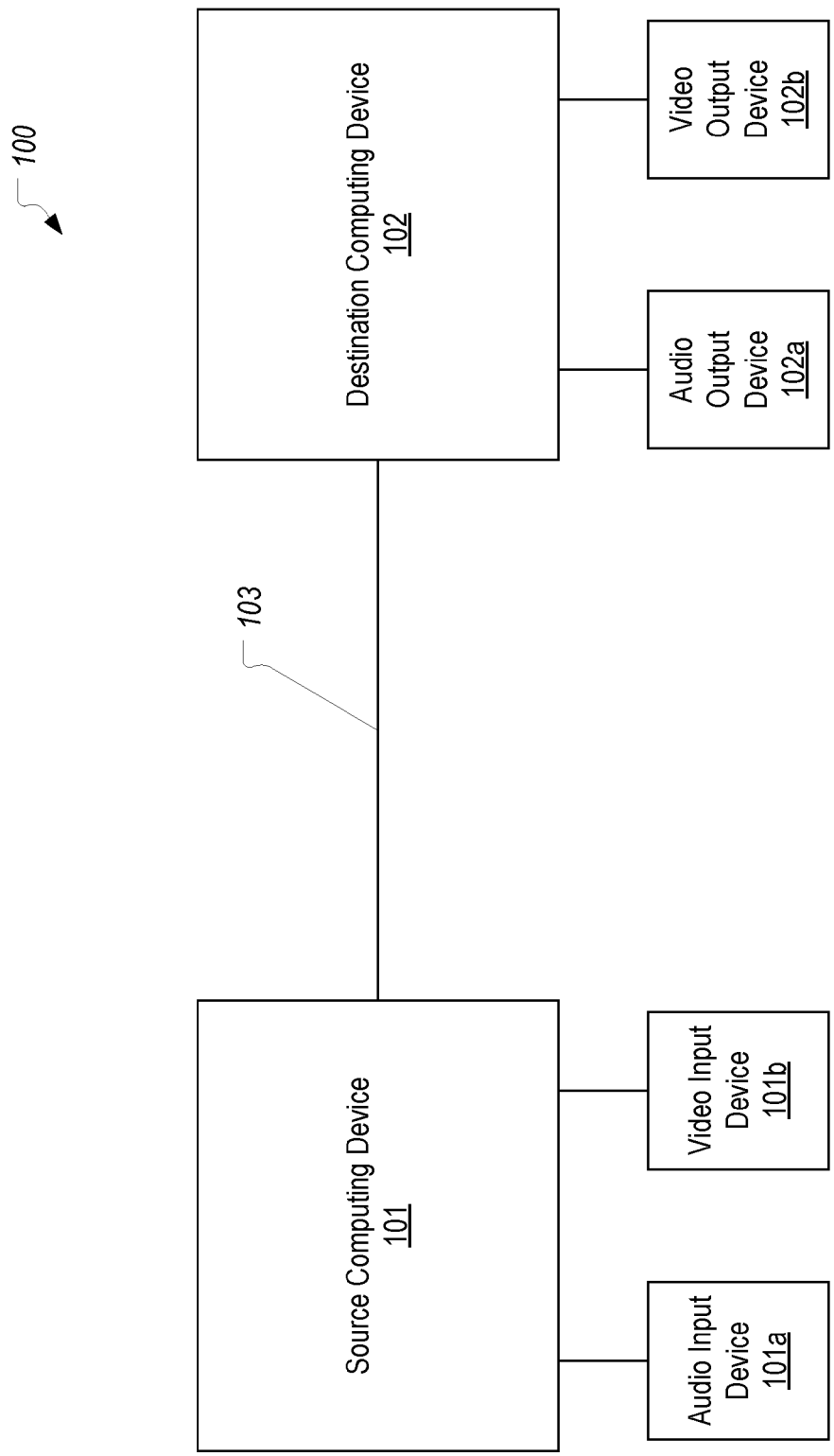
FIG. 1 illustrates an example computing environment in which the present invention can be implemented.

FIG. 1 illustrates an example computing environment 100 in which the present invention can be implemented. Computing environment 100 includes a source computing device 101 to which an audio input device 101a and a video input device 101b are coupled. Audio input device 101a and video input device 101b can be configured to capture audio and video data respectively. For example, audio input device 101a could be a microphone, while video input device 101b could be a webcam. The exact manner in which source computing device 101 is provided with audio and video data is not essential to the invention. Of importance is the fact that video data and corresponding audio data are provided or accessible to source computing device 101. Computing environment 100 also includes a destination computing device 102 that is connected to source computing device 101 via a network 103.

Destination computing device 102 could connect to source computing device 101 in any suitable manner. For example, in some embodiments, source computing device 101 and destination computing device 102 can establish a remote display protocol connection in which case either source computing device 101 or destination computing device 102 could function as a remote session host. Network 103 can represent any type of network including a LAN or a WAN.

Figure 2:
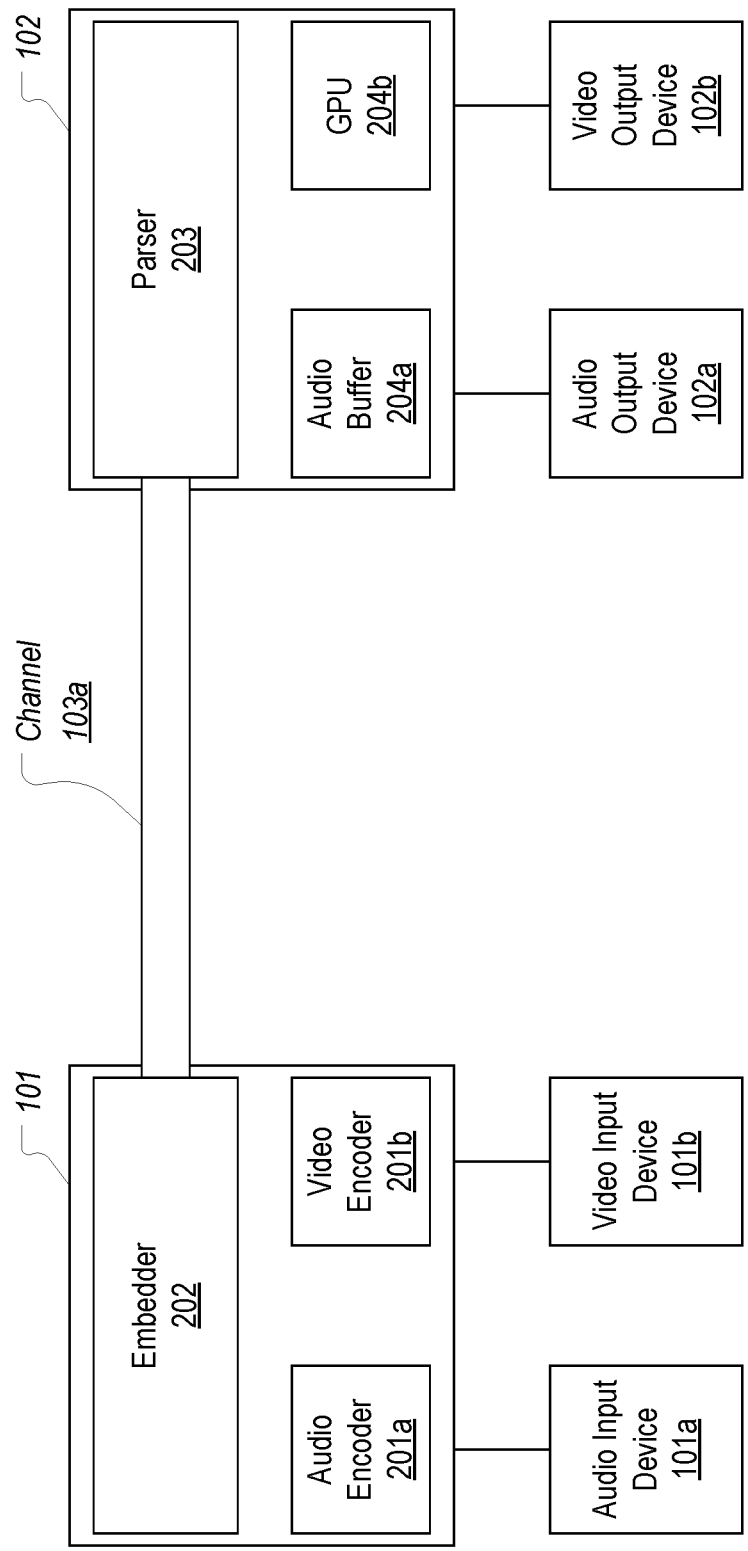
FIG. 2 illustrates various components that can be employed on a source computing device and a destination computing device to implement embodiments of the present invention.

FIG. 2 illustrates various components that can be employed on source computing device 101 and destination computing device 102 to implement embodiments of the present invention. Source computing device 101 can include an audio encoder 201*a* and a video encoder 201*b* for receiving the audio samples and video frames generated by audio input device 101*a* and video input device 101*b* respectively. In some embodiments, audio encoder 201*a* is optional as will be further described below. Video encoder 201*b* can be configured to implement the H.264, H.265 or similar standard to generate an encoded video stream from the input video frames.

In prior art techniques, the output of audio encoder 201*a* and video encoder 201*b* would typically be routed over separate channels or connections to destination computing device 102 which makes it difficult to maintain synchronization. To address such issues, source computing device 101 can be configured with an embedder 202 that can receive the output from audio encoder 201*a* (or potentially un-encoded output directly from audio input device 101*a*) and embed it into the encoded video stream output from video encoder 201*b*. This embedding of the audio can be performed in a manner that ensures synchronous delivery of the audio and video data to destination computing device 102.

Destination computing device 102 can include a parser 203 which is configured to receive the encoded video stream with the embedded audio from source computing device 101. Parser 203 can parse the audio from the encoded video stream and deliver it to audio buffer 204*a* for output to audio output device 102 (e.g., a speaker). The encoded video stream (which may still include the embedded audio) can then be passed to GPU 204*b* for rendering and display on video output device 102*b* (e.g., a monitor).

Embedder 202 is depicted as forming a channel 103*a* with parser 203. Channel 103*a* is intended to generally represent any type of network connection between source computing device 101 and destination computing device 102 which would be suitable for transferring an encoded video stream. In a virtual desktop infrastructure environment, channel 103*a* may represent a virtual channel of a remote display protocol connection. Importantly, because the audio is embedded within the encoded video stream, the audio and video data will be transferred over the same channel.

Prior to describing this embedding process, it is noted that the depiction of embedder 202 as a separate component from video encoder 201*b* is for illustrative purposes only. In some embodiments, embedder 202 may be incorporated into video encoder 201*b* (i.e., the audio may be embedded as part of creating the encoded video stream). In other words, in some embodiments, the present invention can comprise a custom video encoder that is configured to embed audio segments as part of the encoded process. In contrast, in other embodiments, the present invention can comprise a separate embedder that is configured to receive an encoded video stream from a standard video encoder and then modify the encoded video stream to provide the embedded audio segments.

Figure 3A:
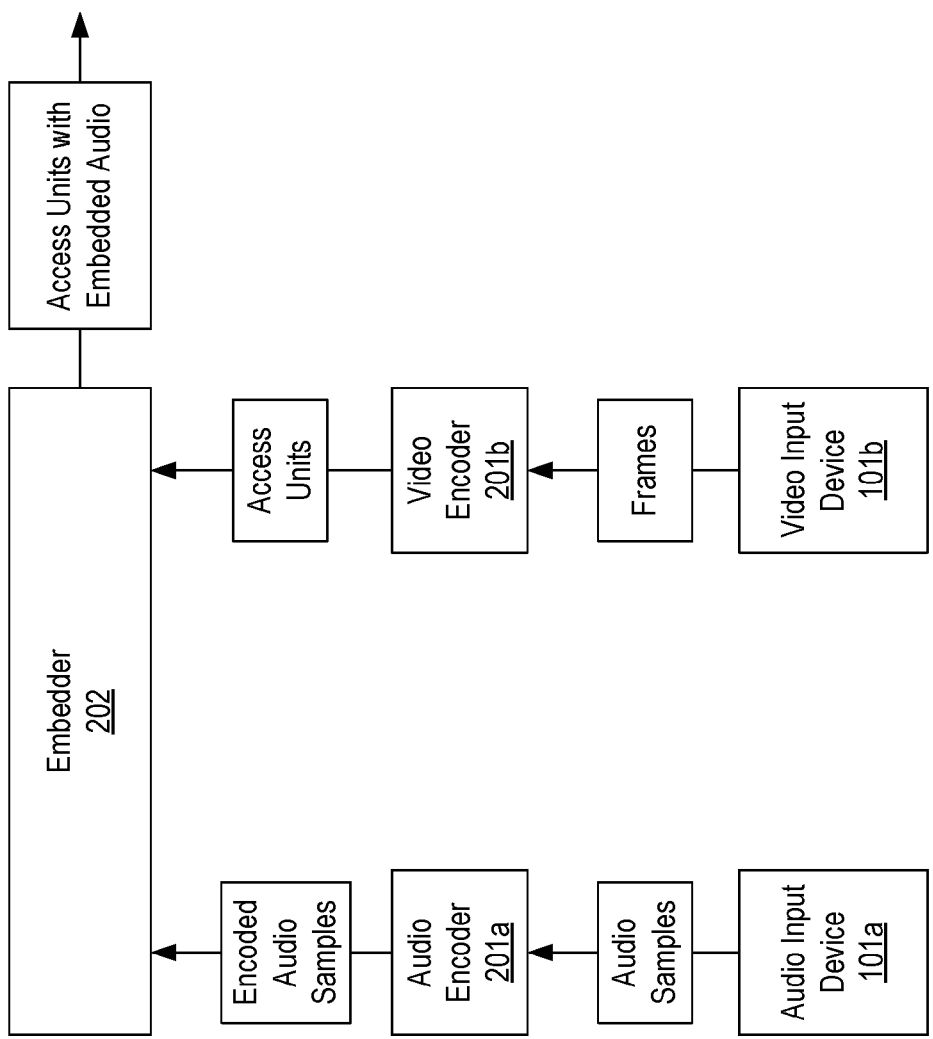
FIGS. 3A and 3B provide a general overview of how audio can be embedded within an encoded video stream.
Figure 3B:
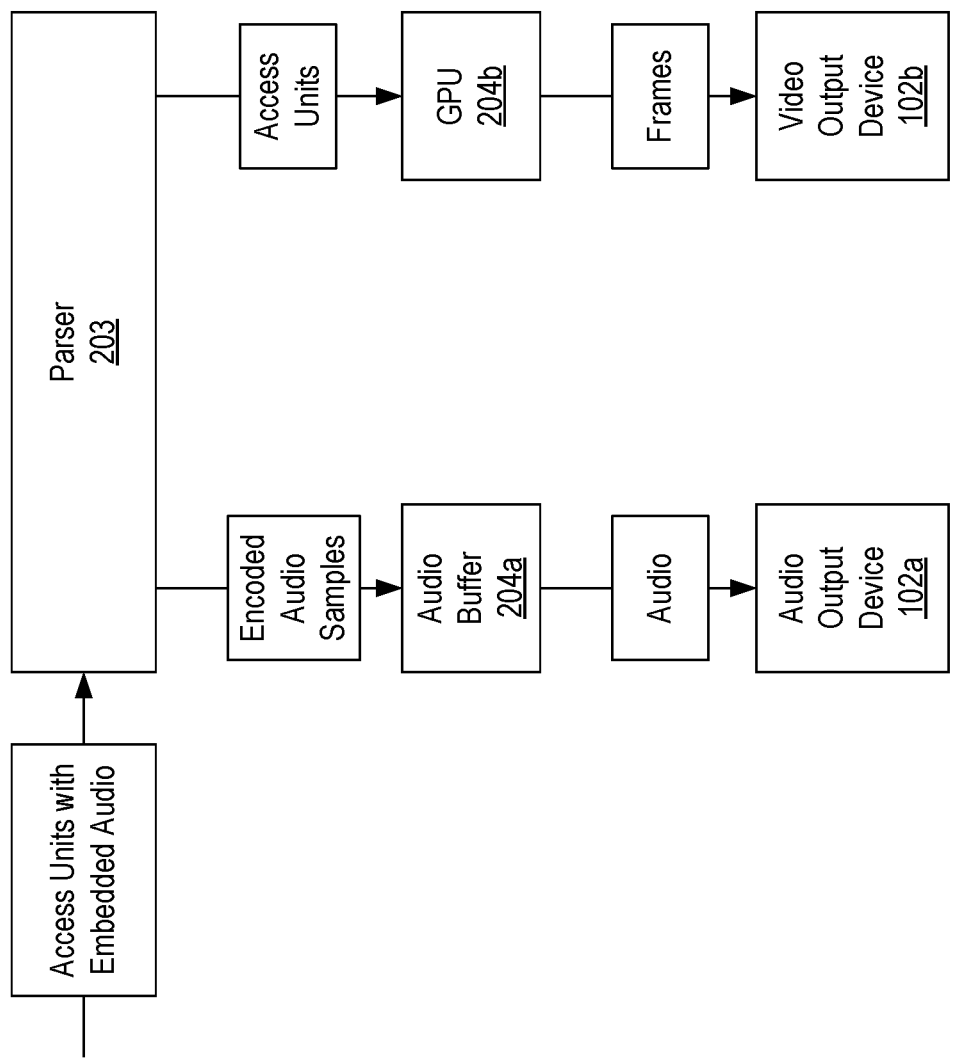

FIGS. 3A and 3B provide a general overview of how audio can be embedded into and then parsed from an encoded video stream. In FIG. 3A, audio input device 101*a* is shown as outputting audio samples. These audio samples will be produced at some suitable rate such as 48 kHz. At the same time, video input device 101*b* will be outputting frames. These frames will be produced at a much slower rate than the audio samples (e.g., 30 frames/second). The audio samples will be received at audio encoder 201*a* which will output encoded audio samples. Likewise, the frames will be received at video encoder 201*b* which will output an access unit for each frame.

The encoded audio samples and access units can then be provided to embedder 202 which can embed a portion of the encoded audio in each access unit, or more particularly, in the access unit defining a frame that corresponds in time with the portion of the encoded audio. As an example, if the frame rate is 30 fps, a portion of encoded audio representing approximately ⅓₀ of a second may be embedded into the corresponding access unit. The output of embedder 202 will therefore be access units that include embedded audio.

Turning to FIG. 3B, the access units with the embedded audio can be transmitted to parser 203 (e.g., over a virtual channel in a VDI environment). Parser 203 can examine the access units to detect and extract the embedded audio from the access units. Accordingly, parser 203 is shown as outputting the encoded audio samples separately from the access units. The encoded audio samples can be output to audio buffer 204*a* while the access units can be output to GPU 204*b*. As a result, audio and frames will be output to audio output device 102*a* and video output device 102*b* respectively. Because the audio is embedded in the access units as they are received at destination computing device 102, it will ensure that the audio and corresponding frames are output synchronously.

Figure 4A:
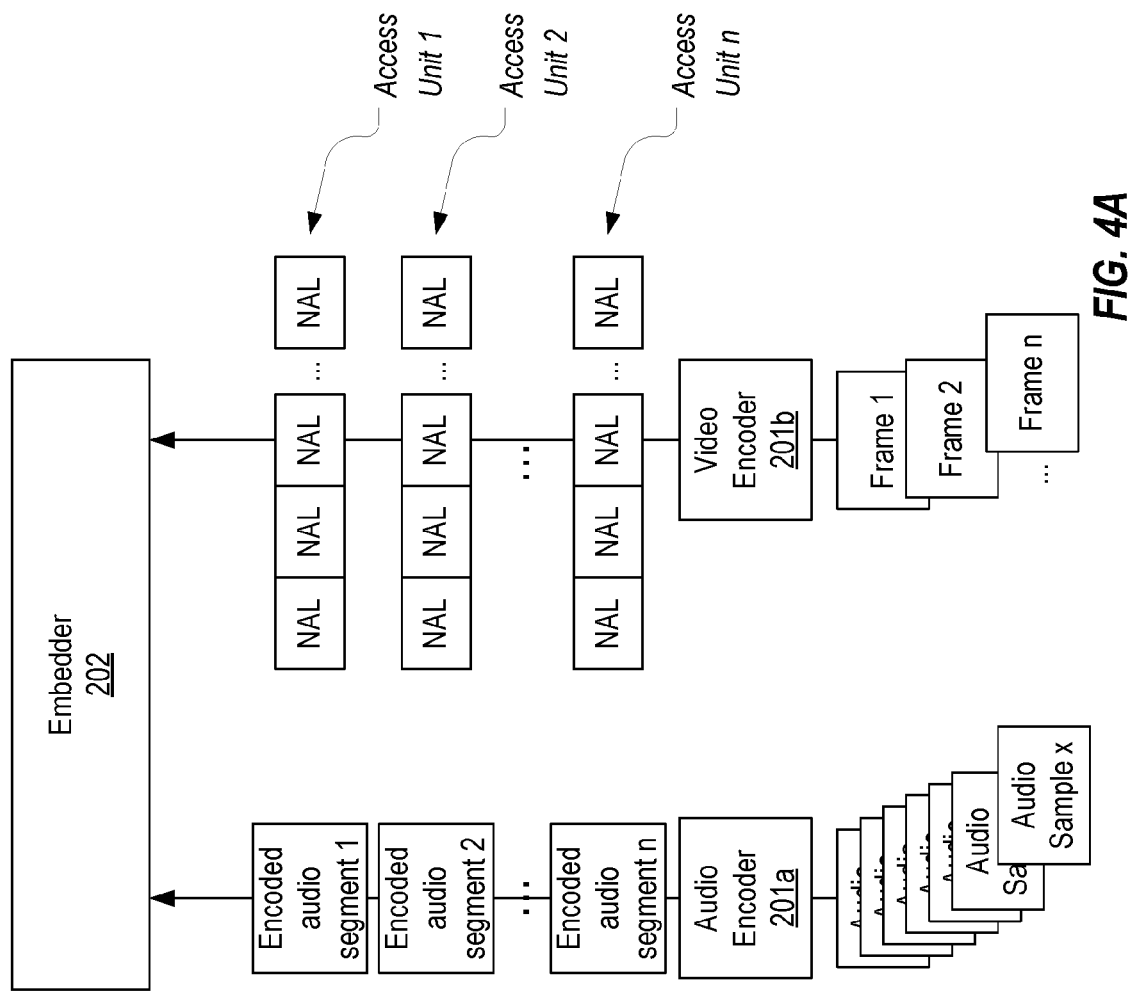
FIGS. 4A-4C provide a more detailed example of how an encoded audio segment can be embedded within a supplement enhancement information network abstraction layer unit of an access unit.
Figure 4B:
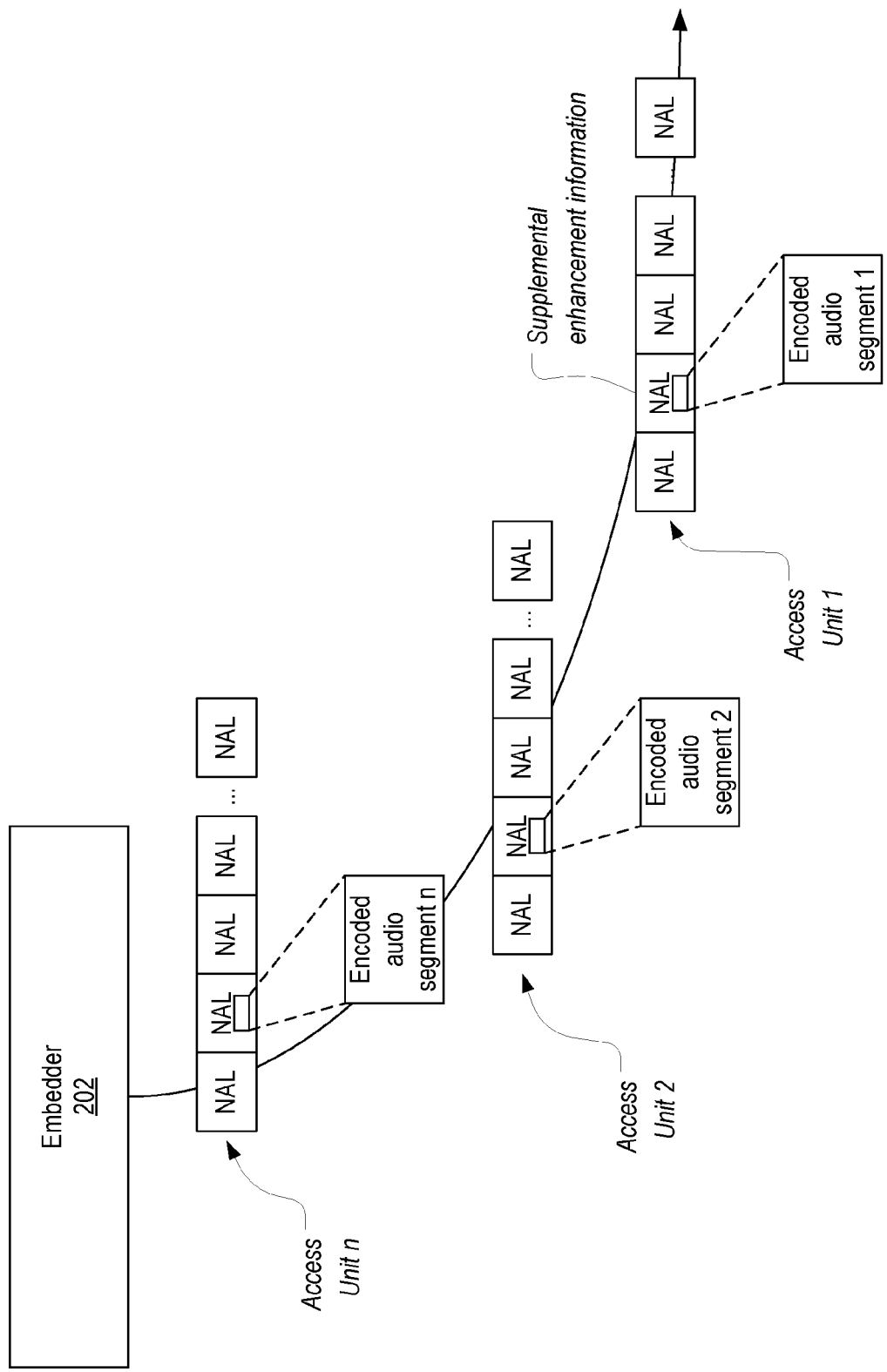
Figure 4C:
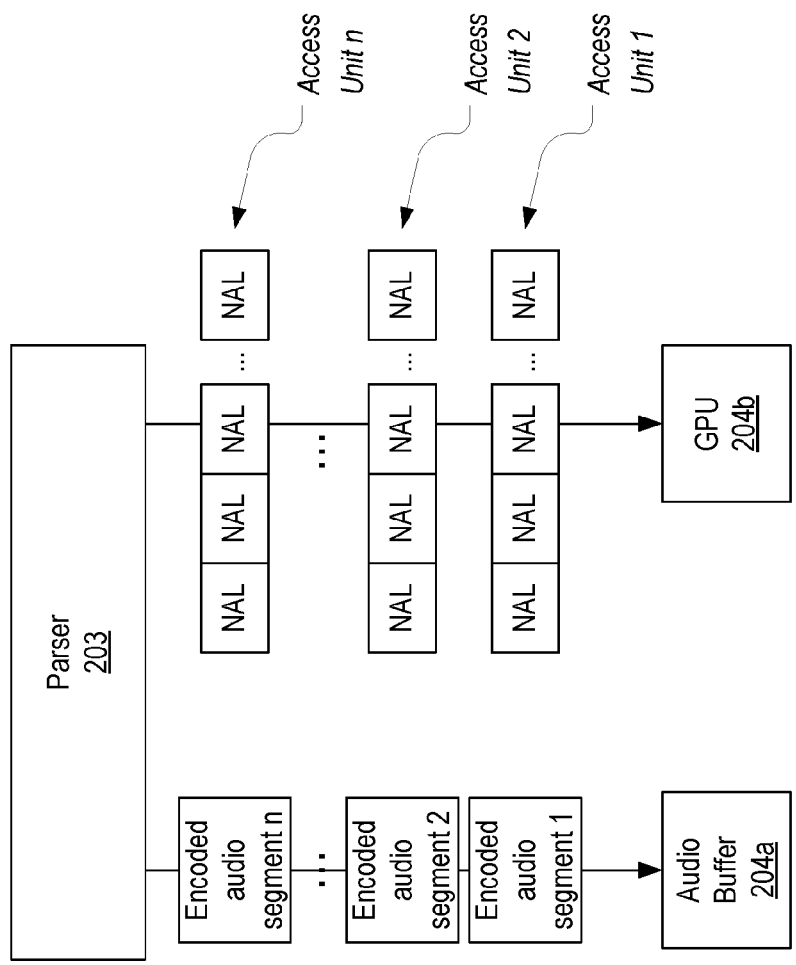

FIGS. 4A-4C provide a more detailed example of how the audio can be embedded in accordance with embodiments of the present invention. As shown in FIG. 4A, audio encoder 201*a* can be provided with a sequence of audio samples 1-x (where x represents any integer) while video encoder 201*b* is provided frames 1-n (where n represents any integer which will likely be significantly smaller than x). These frames can be in any suitable format (e.g., YUV). Of course, during operation of a webcam and microphone, a continuous stream of audio samples and frames would be provided. As audio samples are input to audio encoder 201*a*, it will output encoded audio which is depicted as encoded audio segments 1-n for illustrative purposes. Also, for each frame that is input to video encoder 201*b*, an access unit consisting of a number of NAL units will be output. The encoded audio and access units can then be provided to embedder 202. As noted above, this process will be performed continuously as audio input device 101*a* and video input device 101*b* continue to output audio samples and frames.

It is noted that an access unit will typically include a number of different types of NAL units. These units can be divided into two general categories: VCL units which contain the actual graphical data, and non-VCL units which contain any associated information. Importantly, one type of non-VCL unit is a supplemental enhancement information (SEI) NAL unit which can be used to provide information that is not necessary for decoding the content of the VCL units.

Embedder 202 can receive each access unit as well as the corresponding encoded audio segment and store it within a NAL unit of the access unit. In particular, embedder 202 can add an SEI NAL unit that contains the corresponding encoded audio segment to each access unit (in cases where video encoder 201*b* is not configured to include the SEI NAL in the access unit) or populate an SEI NAL unit in each access unit with the corresponding encoded audio segment (in cases where video encoder 201b is configured to include an empty SEI NAL unit in the access unit). In either case, as shown in FIG. 4B, the output of embedder 202 will be access units that include embedded audio that corresponds with the frame that the access unit represents.

These access units with the embedded audio can then be transmitted over channel 103a to parser 203. Because the audio corresponding to a particular frame is embedded in the access unit for that frame, the audio and video data will be received at destination computing device 102 at the same time. Therefore, there is no possibility that the video data will be delayed relative to the audio data.

As shown in FIG. 4C, parser 203 can receive each access unit and examine it for an SEI NAL unit. In particular, parser 203 can look for SEI NAL units that have a payload type of 5 (i.e., user data unregistered). For each SEI NAL unit having a payload type of 5, parser 203 can extract the payload (i.e., the audio segment) and store it in audio buffer 204a. With the audio segment extracted from the access unit, parser 203 can pass the access unit to GPU 204b for rendering. Although not shown in FIG. 4C, the access units output from parser 203 may still contain the SEI NAL units with the audio segments which GPU 204b may choose to ignore during rendering. Alternatively, parser 203 could remove the SEI NAL units containing audio samples from the access units prior to passing the access units to GPU 204b.

In summary, the present invention provides a way to synchronize audio and video data by embedding audio data within an encoded video stream. By embedding the audio in this manner, the audio can be delivered over a network with the corresponding video data. This synchronized delivery will ensure synchronized output of the audio and video on the destination computing device.

Figure 5:
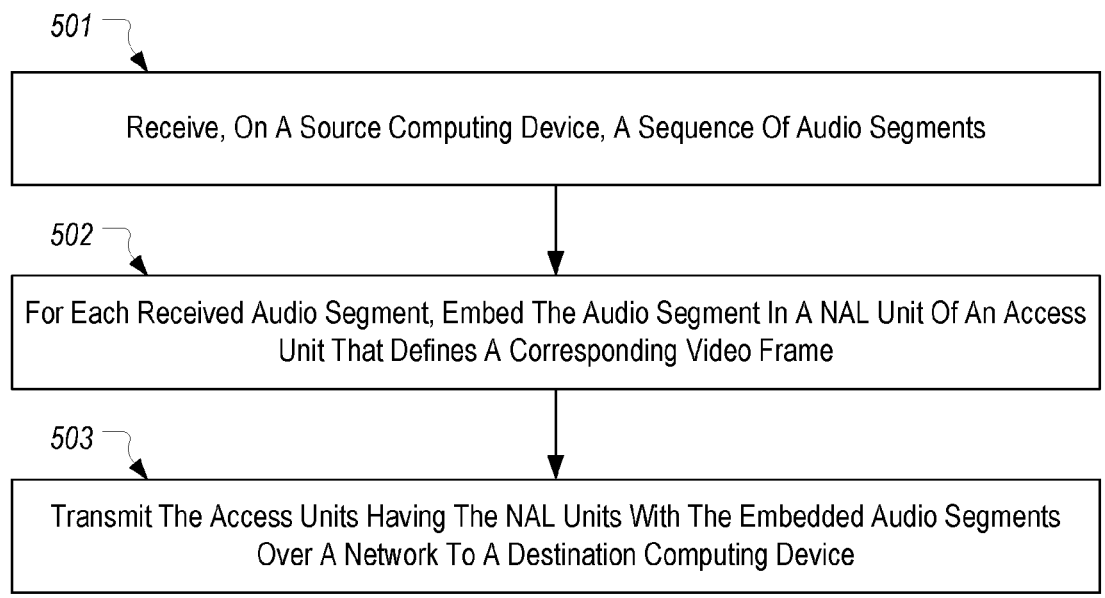
FIG. 5 provides a flowchart of an example method for enforcing synchronization by embedding audio within video frame data.

FIG. 5 provides a flowchart of an example method 500 for enforcing synchronization by embedding audio within video frame data. Method 500 can be implemented on a source computing device that includes an encoder configured to convert raw video data into an encoded video stream.

Method 500 includes an act 501 of receiving, on a source computing device, a sequence of audio segments. For example, embedder 202 (which can be a component/function of video encoder 201b) can receive a sequence of audio segments.

Method 500 includes an act 502 of, for each received audio segment, embedding the audio segment in a NAL unit of an access unit that defines a corresponding video frame. For example, embedder 202 can store each audio segment in the payload of a NAL unit in a corresponding access unit.

Method 500 includes an act 503 of transmitting the access units having the NAL units with the embedded audio segments over a network to a destination computing device. For example, the access units can be transmitted to destination computing device 102.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enforcing synchronization by embedding audio within video frame data, the method comprising:
   receiving, on a source computing device, a sequence of audio segments;
   for each received audio segment, embedding the audio segment in a network abstraction layer (NAL) unit of an access unit that defines a corresponding video frame; and
   transmitting the access units having the NAL units with the embedded audio segments over a network to a destination computing device.

2. The method of claim 1, wherein each audio segment represents a number of audio samples.

3. The method of claim 1, wherein the audio samples represented in each audio segment correspond in time with the corresponding video frame.

4. The method of claim 1, wherein the NAL unit comprises a Supplemental Enhancement Information (SEI) NAL unit.

5. The method of claim 4, wherein the SEI NAL unit has a payload of type 5.

6. The method of claim 1, wherein embedding the audio segment in the NAL unit comprises storing the audio segment in an existing NAL unit.

7. The method of claim 1, wherein embedding the audio segment in the NAL unit comprises adding the NAL unit to the access unit.

8. The method of claim 1, wherein the access units conform to the H.264 or the H.265 standard.

9. The method of claim 1, further comprising:
receiving, at the destination computing device, the access units having the NAL units with the embedded audio segments;
processing the access units to extract the audio segments from the NAL units;
providing the audio segments to an audio buffer; and
providing the access units to a graphics processing unit (GPU).

10. The method of claim 9, wherein processing the access units to extract the audio segments from the NAL units comprises examining the NAL units to detect SEI NAL units having a payload of type 5 and extracting the payload from the detected SEI NAL units.

11. The method of claim 9, wherein the NAL units with the embedded audio segments are removed from the access units prior to providing the access units to the GPU.

12. The method of claim 9, wherein the access units provided to the GPU still have the NAL units with the embedded audio segments.

13. A method for enforcing synchronization by embedding audio within video frame data, the method comprising:
receiving, at a destination computing device, a sequence of access units, each access unit defining a corresponding video frame;
processing each access unit by examining network abstraction layer (NAL) units of the access unit;
upon detecting a Supplemental Enhancement Information (SEI) NAL unit in an access unit, extracting a payload of the SEI NAL unit and storing the payload in an audio buffer; and
providing each access unit to a GPU graphics processing unit (GPU).

14. The method of claim 13, wherein detecting an SEI NAL unit in an access unit comprises detecting an SEI NAL unit having a payload type identifying a payload as user data.

15. The method of claim 14, wherein the payload type identifying a payload as user data comprises a payload of type 5.

16. The method of claim 13, further comprising:
removing the SEI NAL unit from the access unit.

17. The method of claim 13, wherein the access units provided to the GPU still include the SEI NAL unit.

18. The method of claim 13, wherein the payload of the SEI NAL unit in each access unit comprises an audio segment corresponding to a video frame defined by the access unit.

19. One or more computer storage media storing computer-executable instructions which when executed implement an encoder that is configured to perform the following:
receive audio and video data; and
generate an encoded video stream by:
creating an access unit for each frame defined in the video data; and
for each respective access unit, storing a segment of the audio in a Supplemental Enhancement Information (SEI) network abstraction layer (NAL) unit of the respective access unit.

20. The computer storage media of claim 19, wherein storing a segment of the audio in an SEI NAL unit of the access unit comprises configuring a payload type of the SEI NAL unit to have a value identifying the payload as user data.

* * * * *